(12) United States Patent
Nakayama et al.

(10) Patent No.: US 10,762,329 B2
(45) Date of Patent: Sep. 1, 2020

(54) INTER-OBJECT RELATION RECOGNITION APPARATUS, LEARNED MODEL, RECOGNITION METHOD AND NON-TRANSITORY COMPUTER READABLE MEDIUM

(71) Applicants: Hideki Nakayama, Tokyo (JP); Kento Masui, Tokyo (JP); Shintaro Yoshizawa, Nagoya (JP); Akiyoshi Ochiai, Sunnyvale, CA (US)

(72) Inventors: Hideki Nakayama, Tokyo (JP); Kento Masui, Tokyo (JP); Shintaro Yoshizawa, Nagoya (JP); Akiyoshi Ochiai, Sunnyvale, CA (US)

(73) Assignees: Toyota Jidosha Kabushiki Kaisha, Toyota-shi, Aichi-ken (JP); The University of Tokyo, Bunkyo-ku, Tokyo (JP)

( * ) Notice: Subject to any disclaimer, the term of this patent is extended or adjusted under 35 U.S.C. 154(b) by 134 days.

(21) Appl. No.: 16/209,116

(22) Filed: Dec. 4, 2018

(65) Prior Publication Data

US 2019/0171864 A1   Jun. 6, 2019

(30) Foreign Application Priority Data

Dec. 6, 2017   (JP) ................................ 2017-234246

(51) Int. Cl.
*G06K 9/00* (2006.01)
*G06N 3/04* (2006.01)
(Continued)

(52) U.S. Cl.
CPC ..... *G06K 9/00201* (2013.01); *G06K 9/00664* (2013.01); *G06K 9/6274* (2013.01);
(Continued)

(58) Field of Classification Search
CPC ......... G06T 7/77; G06T 19/006; G06N 7/005; G06N 99/005; G06N 20/00;
(Continued)

(56) References Cited

U.S. PATENT DOCUMENTS

2014/0355861 A1   12/2014   Nirenberg et al.
2017/0255837 A1   9/2017   Nirenberg et al.

FOREIGN PATENT DOCUMENTS

JP   2014524630 A   9/2014
JP   2017004350 A   1/2017

OTHER PUBLICATIONS

Atzmon, Yuval et al., "Learning to generalize to new compositions in image understanding", arXiv preprint arXiv; 1608.07639, Aug. 27, 2016.

*Primary Examiner* — Phuoc H Doan
(74) *Attorney, Agent, or Firm* — Dinsmore & Shohl LLP

(57) ABSTRACT

An Inter-object relation recognition apparatus includes: a first learning device receiving an image, and outputting a first feature amount of the image; a second learning device receiving the first feature amount, outputting a second feature amount, and having a plurality of storage units holding internal states for predetermined steps; a triplet unit having a plurality of triplet-units, the triplet-units receiving the second feature amount, recognizing first to third elements, and constituted of first to third recognition units outputting probability information. The triplet unit selects at least one combination of the first to third elements, based on the probability information of the first to third elements output from the first to third recognition units of each of the triplet units, from the combinations of the first to third elements output from each of the triplet units, and recognizes and outputs the combination as a relation between objects.

8 Claims, 11 Drawing Sheets

(51) Int. Cl.
  *G06N 3/08* (2006.01)
  *G06K 9/72* (2006.01)
  *G06K 9/62* (2006.01)

(52) U.S. Cl.
  CPC .............. *G06K 9/72* (2013.01); *G06N 3/0454* (2013.01); *G06N 3/08* (2013.01)

(58) Field of Classification Search
  CPC ........... G06Q 30/0643; G06K 9/00671; G06K 9/6232; G06K 9/6267; G06F 17/30256; G06F 17/30259; G06F 17/28
  USPC ................................ 382/181, 154, 187, 190
  See application file for complete search history.

INTER-OBJECT RELATION RECOGNITION APPARATUS, LEARNED MODEL, RECOGNITION METHOD AND NON-TRANSITORY COMPUTER READABLE MEDIUM

CROSS REFERENCE TO RELATED APPLICATIONS

This application is based upon and claims the benefit of priority from Japanese patent application No. 2017-234246, filed on Dec. 6, 2017, the disclosure of which is incorporated herein in its entirety by reference.

BACKGROUND

The present disclosure relates to an inter-object relation recognition apparatus, a learned model, a recognition method, and a program for recognizing a relation between objects included in an image.

It is known that there is an inter-object relation recognition apparatus that learns a plurality of relations between objects included in an image, and recognizes and outputs the relation between objects, based on the learning result (See, for example, Yuval Atzmon, Jonathan Berant, Vahid Kezami, Amir Globerson, Gal Chechik, Learning to generalize to new compositions in image understanding, arXiv preprint arXiv; 1608.07639, 2016).

SUMMARY

The inter-object relation recognition apparatus described above extracts all the relations between objects included in the image, and then outputs the relation between objects. For this reason, there is a possibility that it takes time to output the relation between objects.

The present disclosure has been made to solve such a problem, and a main object of the present disclosure is to provide an inter-object relation recognition apparatus, a learned model, a recognition method and a program capable of outputting relations between objects in a short time, by sequentially recognizing the relations between objects included in the image.

A first exemplary aspect to achieve the above-described object is an inter-object relation recognition apparatus configured to perform learning based on learning data associated with an image, and a plurality of relations between objects included in the image, and to recognize and output the relations between objects included in the image using a result of the learning, the apparatus including a first learning device configured to receive the image and output a first feature amount indicating a feature of the image; a second learning device configured to receive the first feature amount output from the first learning device and output a second feature amount of a lower dimension number than the first feature amount, and the second learning device including a plurality of storage units holding internal states for predetermined steps; and a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements. The triplet unit selects at least one combination of the first, second, and third elements, based on the probability information of the first, second, and third elements output from the first, second, and third recognition units of each of the triplet-units, from the combinations of the first, second, and third elements output from each of the triplet-units, and recognizes and outputs the selected combination of the first, second, and third elements as the relation between objects included in the image.

In this aspect, the second learning device may be a recurrent neural network, and the second learning device and the triplet unit may perform the learning by optimizing parameters of a predetermined function, based on learning data associating the image and the relations between objects and hold the optimized parameter as the result of the learning.

In this aspect, the first and third recognition units may respectively output the probability information of the first and third elements to the second recognition unit, and the second recognition unit may recognize the second element, based on the first and third elements output from the first and third recognition units, and the second feature amount output from the corresponding storage unit of the second learning device, and may output the probability information of the second element.

In this aspect, the storage unit of the second learning device may be an LSTM (Long Short-Term Memory).

In this aspect, the first learning device may be configured as a convolution type neural network.

Another exemplary aspect to achieve the above-described object may be a learned model for making a computer function including a first learning device configured to receive an image, output a first feature amount indicating a feature of the image; a second learning device configured to receive the first feature amount output from the first learning device, output a second feature amount of a lower dimension number than the first feature amount, and have a plurality of storage units holding internal states for predetermined steps; and a triplet unit including a plurality of triplet-units, the triplet-units connected to each storage unit of the second learning device, receiving the second feature amount output from each of the storage units, constituted of first, second, and third recognition units, and outputting combinations of the first, second, and third elements, the first, second, and third recognition units respectively recognizing the first, second, and third elements based on the received second feature amount, outputting probability information of the first, second, and third elements. The triplet unit is configured to select at least one combination of the first, second, and third elements, based on the probability information of the first, second, and third elements output from the first, second, and third recognition units of each of the triplet-units, from the combinations of the first, second, and third elements output from each of the triplet-units, and recognize the selected combination of the first, second, and third elements as the relation between objects included in the image. A weighting coefficient of the first learning device, the second learning device, and the triplet unit is learned, based on learning data associating the image and the relations between objects included in the image. When an image of a recognition target is input, it is intended that the first learning device, the second learning device, and the triplet unit perform calculations based on the learned weighting coefficients, and each relation between objects included in the image of the recognition target is recognized.

Another exemplary aspect to achieve the above-described object may be a recognition method of an inter-object relation recognition apparatus including a first learning device configured to receive an image, output a first feature amount indicating a feature of the image; a second learning device configured to receive the first feature amount output from the first learning device, output a second feature amount of a lower dimension number than the first feature amount, and have a plurality of storage units holding internal states for predetermined steps; and a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements. The triplet unit selects at least one combination of the first, second, and third elements, based on the probability information of the first, second, and third elements output from the first, second, and third recognition units of each of the triplet-units, from the combinations of the first, second, and third elements output from each of the triplet-units, and recognizes and outputs the selected combination of the first, second, and third elements as the relation between objects included in the image.

Another exemplary aspect to achieve the above-described object may be a program of an inter-object relation recognition apparatus including a first learning device configured to receive an image, output a first feature amount indicating a feature of the image; a second learning device configured to receive the first feature amount output from the first learning device, output a second feature amount of a lower dimension number than the first feature amount, and have a plurality of storage units holding internal states for predetermined steps; and a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements. The triplet unit makes a computer to execute a process of selecting at least one combination of the first, second, and third elements, based on the probability information of the first, second, and third elements output from the first, second, and third recognition units of each of the triplet-units, from the combinations of the first, second, and third elements output from each of the triplet-units, and recognizing and outputting the selected combination of the first, second, and third elements as the relations between objects included in the image.

According to the present disclosure, it is possible to provide an inter-object relation recognition apparatus, a learned model, a recognition method and a program capable of outputting relations between objects in a short time, by sequentially recognizing the relations between objects included in the image.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Embodiment 1

Hereinafter, embodiments of the present disclosure will be described with reference to the drawings.

Figure 1:
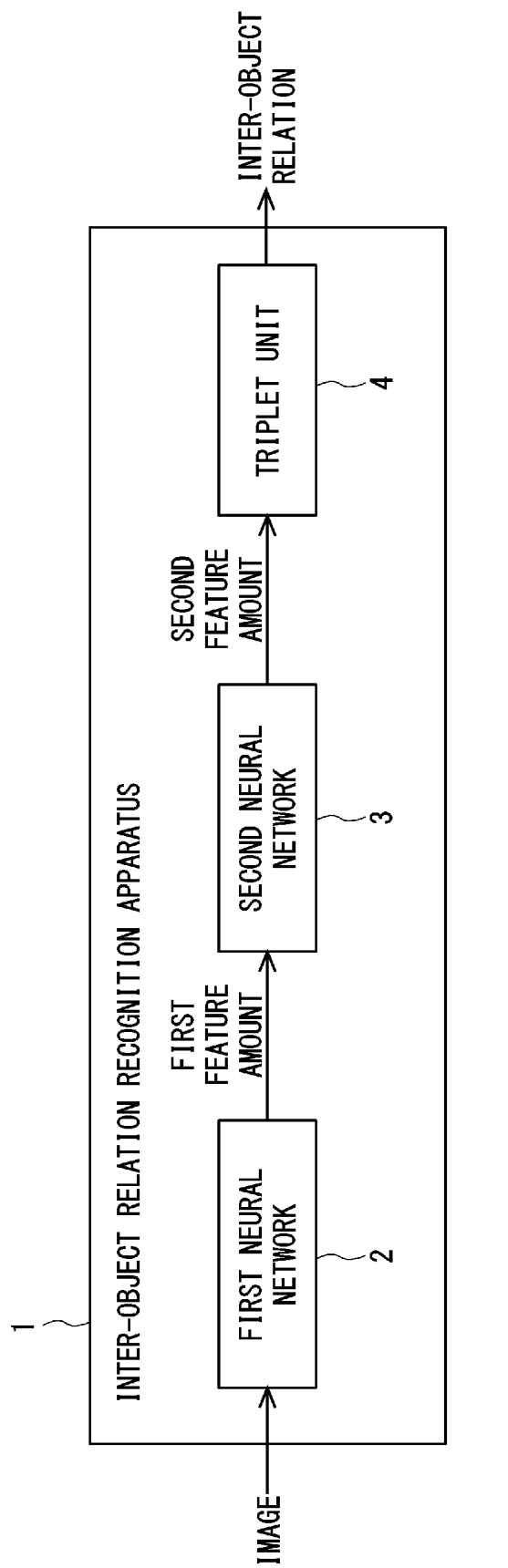
FIG. 1 is a block diagram illustrating a schematic system configuration of an inter-object relation recognition apparatus according to a first embodiment of the present disclosure.

FIG. 1 is a block diagram illustrating a schematic system configuration of an inter-object relation recognition apparatus according to a first embodiment of the present disclosure. The inter-object relation recognition apparatus 1 according to the first embodiment recognizes, for example, a plurality of objects near a robot operating in a general environment such as a home, and recognizes and outputs each relation between objects.

The inter-object relation recognition apparatus 1 according to the first embodiment includes a first neural network 2, a second neural network 3, and a triplet unit 4.

The inter-object relation recognition apparatus 1 is hardware-configured mainly of a microcomputer including, for example, a CPU (Central Processing Unit) performing arithmetic processing and the like, a memory configured of a ROM (Read Only Memory) and a RAM (Random Access Memory) that store calculation programs and the like executed by the CPU, an interface unit (I/F) inputting and outputting signals from and to the outside, and the like. The CPU, the memory, and the interface unit are mutually connected via a data bus or the like.

The first neural network 2 is a specific example of a first learning device. The first neural network 2 is configured as, for example, a convolution type neural network (CNN). For example, when image information is input, the first neural network 2 outputs a 4096-dimensional vector value as a first feature amount of the image.

The first feature amount is an image feature amount extracted by the first neural network 2, and a second feature amount described later is the image feature amount extracted by the second neural network 3. As an input of the first neural network 2, one made from a bounding box defined on a body in the image is input, and the first neural network 2 may output the first feature amount.

The number of dimensions of the first feature amount output by the first neural network 2 is an example and is not limited to this and can be arbitrarily set as long as the calculation resources are allowed.

Figure 2:
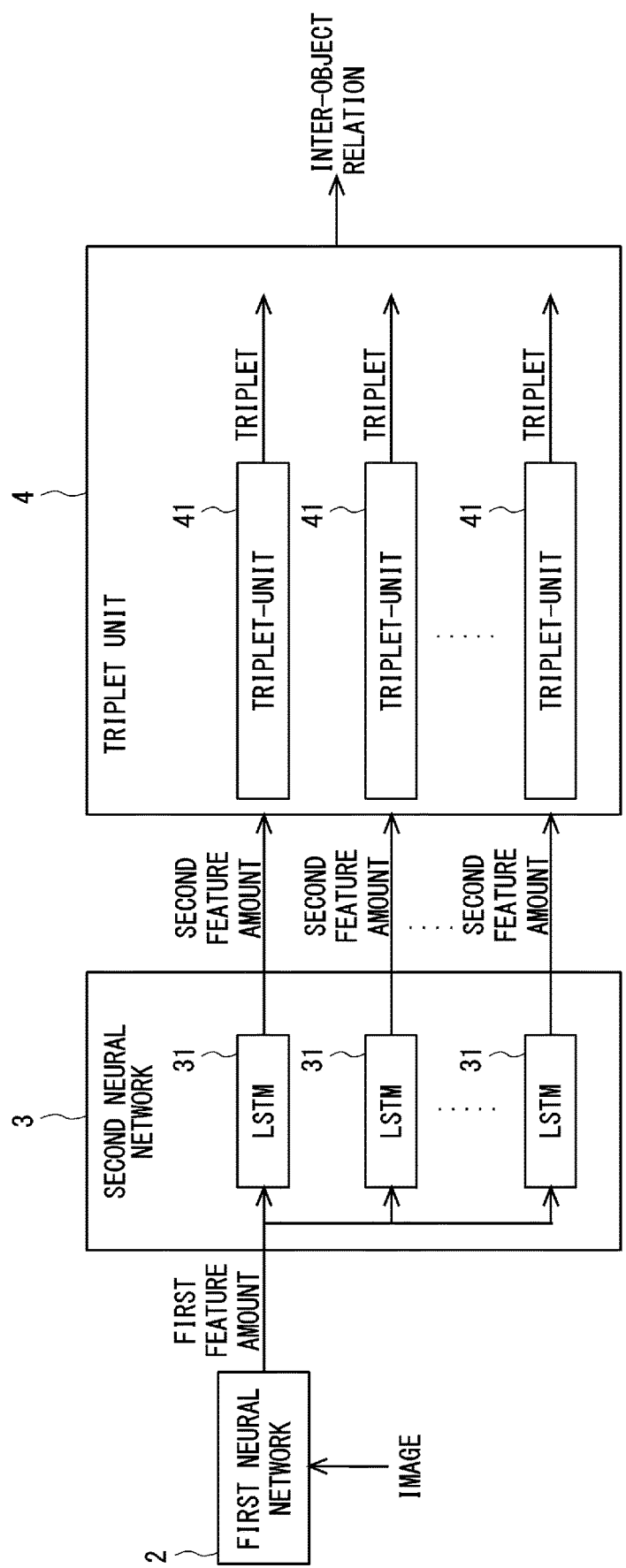
FIG. 2 is a block diagram illustrating a schematic configuration of a second neural network and a triplet unit according to the first embodiment.

FIG. 2 is a block diagram illustrating a schematic configuration of a second neural network and a triplet unit according to the first embodiment. The second neural network 3 is a specific example of a second learning device. The second neural network 3 is configured, for example, as a recurrent neural network (RNN). The second neural network 3 has a plurality of LSTMs (Long Short-Term Memory) 31.

The LSTM31, for example, receives the first feature amount of the 4096-dimensional vector output from the first neural network 2 and outputs the second feature amount of a 1024-dimensional vector of a lower dimension number than the first feature amount. By reducing the number of dimensions of the feature amount by the first neural network 2 in this manner, a calculation amount can be reduced.

The LSTM31 holds internal states for predetermined steps and successively receives the first feature amount from the first neural network 2. The LSTM31 is modeled to update an internal state in a certain step t according to input. In the first embodiment, a LSTM31 in step t is denoted as $LSTM_t$.

Every time the first feature amount is input from the first neural network 2, the LSTM31 updates the internal states and outputs the second feature amount of 1024 dimensions. The number of dimensions of the second feature amount output by the LSTM31 described above is an example, and it is not limited to this, and it can be arbitrarily set as long as the calculation resources are allowed.

The triplet unit 4 is configured of a plurality of triplet-units 41, corresponding to the LSTMs31 of the second neural network 3. Each triplet-unit 41 of the triplet unit 4 is connected to the corresponding LSTM31 of the second neural network 3, respectively. To each triplet-unit 41, the second feature amount output from the LSTM31 is input.

Figure 3:
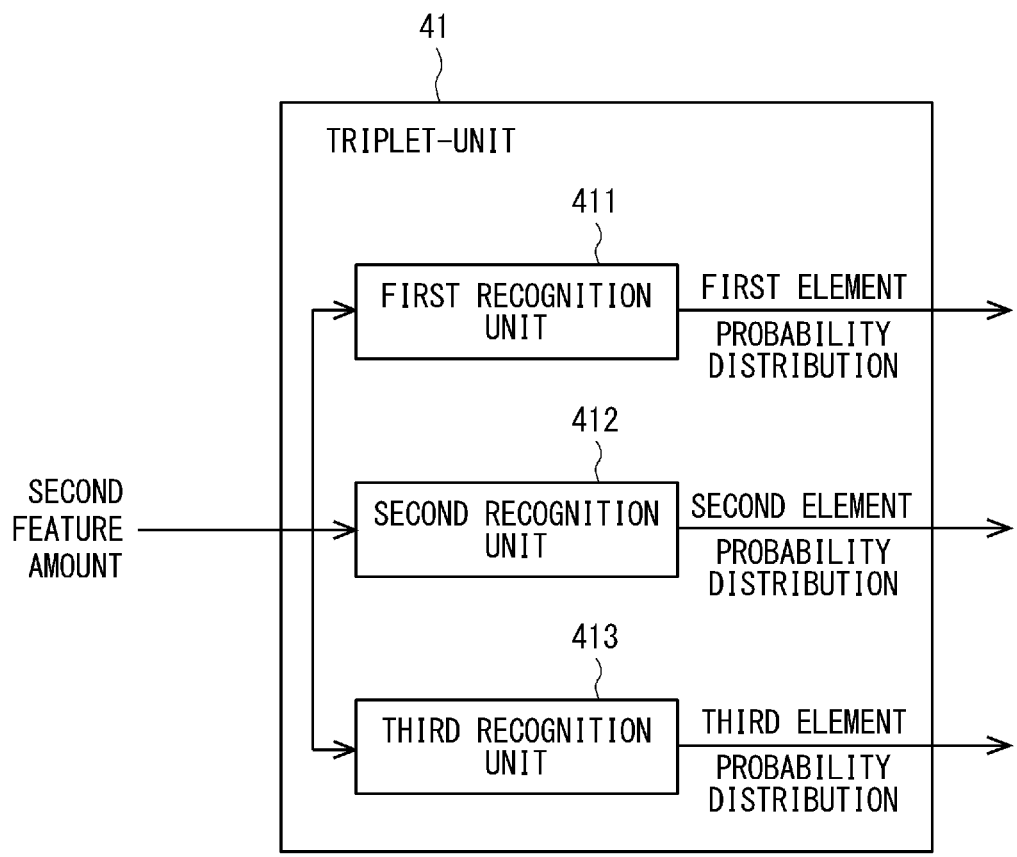
FIG. 3 is a block diagram illustrating a schematic configuration of a triplet-unit according to the first embodiment.

FIG. 3 is a block diagram illustrating a schematic configuration of a triplet-unit according to the first embodiment. The triplet-unit 41 has independent first, second, and third recognition units 411, 412, 413 which recognize a subject which is a first element, a predicate which is a second element, and an object which is a third element, based on the second feature amount output from the LSTM31.

For example, the first recognition unit 411 recognizes subjects (subject words) such as "Monitor", "Mouse", or the like, based on the second feature amount output from the LSTM31. The second recognition unit 412 recognizes predicates (predicate words) such as "on", "sitting", or the like, based on the second feature amount output from the LSTM31. The third recognition unit 413 recognizes an object (object word) such as "table", based on the second feature amount output from the LSTM31. Then, the first, second, and third recognition units 411, 412, 413 output a posterior probability distribution (an example of probability information) of the subject, the predicate, and the object of recognition results as vectors, respectively.

The triplet unit 4 selects at least one triplet (class), based on the posterior probability distribution vectors of the subject, the predicate, and the object output from the first, second, and third recognition units 411, 412, 413 of each triplet-unit 41, from triplets (combination of the subject, the predicate, and the object) output from each triplet-unit 41.

The triplet unit 4 selects, for example, the triplet having the vector to be the maximum value, based on the posterior probability distribution vectors of the subject, the predicate, and the object output from the first, second, and third recognition units 411, 412, 413 of each triplet-unit 41, from the triplets output from each triplet-unit 41. Further, the triplet unit 4 may select, for example, the triplet having vector to be equal to or larger than a predetermined value, based on the posterior probability distribution vectors of the subject, the predicate, and the object output from the first, second, and third recognition units 411, 412, 413 of each triplet-unit 41, from the triplets output from each triplet-unit 41. The triplet unit 4 outputs the selected triplet as an inter-object relation.

As described above, the inter-object relation recognition apparatus 1 according to the first embodiment recognizes the inter-object relation, using each triplet-unit 41 of the triplet unit 4. As a result, the calculation amount when recognizing the inter-object relation can be greatly reduced. That is, in a method using a conventional ranking learning, a score is calculated for the relation of the combination of all the objects included in the image from the feature amount, and the calculation amount taken for the recognition was O (third power of N).

On the other hand, the inter-object relation recognition apparatus 1 according to the first embodiment decomposes the inter-object relation into the triplets of the subject, the predicate, and the object using each triplet-unit 41 of the triplet unit 4 and recognizes them. For this reason, the calculation amount of the score required for recognizing each element is O (N), and in order to recognize one triplet, the output results of the first, second, and third recognition units 411, 412, 413 can be used independently. Therefore, the total calculation amount taken for recognition can be suppressed to O (N), and the calculation amount can be reduced.

Subsequently, a recognition method of the inter-object relation recognition apparatus will be described. The inter-object relation recognition apparatus 1 according to the first embodiment performs learning based on previously prepared learning data in a <learning process> as described later. Thereafter, in a <recognition process>, using the learning result of the <learning process>, the inter-object relation recognition apparatus 1 recognizes the inter-object relation indicating each relation between objects included in the image (hereinafter referred to as the recognition target image) including a newly acquired recognition target.

Hereinafter, the <learning process> and <recognition process> will be described in detail.

<Learning Process>

The first neural network 2, the second neural network 3, and the triplet unit 4 perform learning of weighting coefficients of the first neural network 2, the second neural network 3, and the triplet unit 4, based on prepared learning data. Learning data is, for example, a plurality of sets of data groups in which the image and the inter-object relation are associated with each other. Learning data may be stored in advance in a memory or the like, for example.

In the first embodiment, for example, the first neural network 2 may perform learning of the weighting coefficients, based on image data groups, or the like on the Internet in advance, for example. Subsequently, the second neural network 3 and the triplet unit 4 perform learning of the weighting coefficients based on learning data associating the image including a plurality of objects prepared in advance and the inter-object relation.

The second neural network 3 and the triplet unit 4 perform learning of weighting coefficients using, for example, a following batch stochastic gradient descent method. The first neural network 2, the second neural network 3, and the triplet unit 4 may simultaneously perform learning of the weighting coefficients based on learning data.

In the batch stochastic gradient descent method, the second neural network 3 and the triplet unit 4 optimize parameters (LSTM parameter) $\Theta$ of the LSTM31 and parameters (triplet parameters) W of the triplet-unit 41 so as to minimize a loss function L ($\Theta$, W) shown in the following equation (3). The loss function L ($\Theta$, W) is one specific example of a predetermined function.

The second neural network 3 and the triplet unit 4 hold the most accurate parameters in a validation data set as the learning results (learned weighting coefficients) after minimizing (converging) the loss function.

$$y'_t = TU(LSTM_t(CNN(x); \Theta); W) \quad \text{[formula 1]}$$

$$L_t(\Theta, W) = -\sum_{i}^{Ns} S_{ti} \log(S'_{ti}) - \sum_{j}^{Np} P_{tj} \log(P'_{tj}) - \sum_{k}^{No} O_{tk} \log(O'_{tk}),$$

$$L_t(\Theta, W) = \frac{1}{T} \sum_{t}^{T} L_t(\Theta, W),$$

In the above formula, $N_s$, $N_p$, and $N_o$ represent the number of classes of the subject, the predicate, the object, respectively. x represents the image, x is an element of $R^{3 \times 224 \times 224}$. CNN (x) represents the first feature amount output from the first neural network 2, CNN (x) is an element of $R^{4096}$.

$LSTM_t$ represents an output value from the LSTM31 in step t, LSTM is an element of $R^{1024}$. $\Theta$ represents the LSTM parameter. $s'_t$, $p'_t$, $o'_t$ represent the posterior probability distribution vectors of the subject, the predicate, the object in step t output from the first, second, and third recognition units 411, 412, 413, respectively. $y'_t$ represents an output value from the triplet-unit 41 in step t, and $y'_t=(s'_t, p'_t, o'_t)$. W represents the triplet parameter.

$s_t$, $p_t$, $o_t$ represent teacher data of the subject, the predicate, the object in step t, respectively. TU ( ) is a triplet function, which is set in the triplet-unit 41 in advance. A sum of outputs $L_t$ ($\Theta$, W) of each LSTM31 in step t in the above equation (2) is the loss function L ($\Theta$, W) shown in the above equation (3).

The second neural network 3 and the triplet unit 4 determine the LSTM parameter (and the triplet parameter W so that a difference between $s'_t$, $p'_t$, $o'_t$ which are output data of the first, second, and third recognition units 411, 412, 413 and $s_t$, $p_t$, $o_t$ which are teacher data is minimized, and minimize the loss function L ($\Theta$, W).

As described above, the first neural network 2, the second neural network 3, and the triplet unit 4 perform learning based on previously prepared learning data and hold the learning result.

<Recognition Process>

Subsequently, the inter-object relation recognition apparatus 1 recognizes the inter-object relation indicating each relation between objects included in the newly acquired recognition target image, using the learning result (LSTM parameter $\Theta$ and triplet parameter W) learned in the above-mentioned <learning process>. The inter-object relation recognition apparatus 1 recognizes the inter-object relation between each object included in the recognition target image, based on the recognition target image. The recognition target image is, for example, an image acquired by a camera of a robot, or an image stored in advance in a memory or the like.

Figure 4:
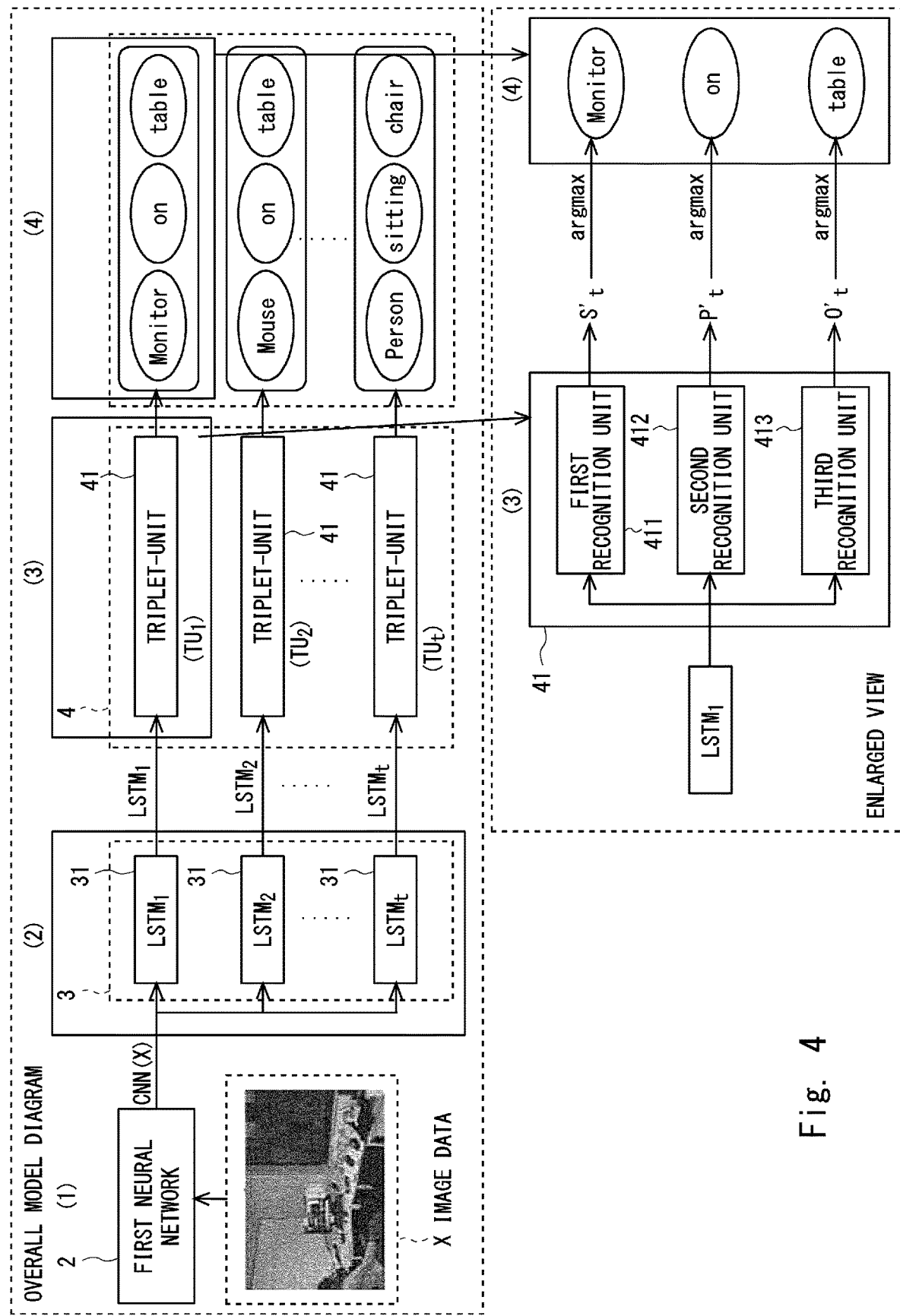
FIG. 4 is a diagram for specifically explaining a recognition process.

For example, as illustrated in FIG. 4, a recognition target image x is input to the first neural network 2 ((1) in FIG. 4).

The first neural network 2 performs calculation based on the learned weighting coefficients, based on the input recognition target image x, and outputs, for example, a first feature amount CNN (x) of the 4096-dimensional vector to each LSTM31 of the second neural network 3.

Each LSTM31 performs calculation according to the LSTM parameter $\Theta$ set in the learning process, based on the first feature amount CNN (x) from the first neural network 2, and outputs, for example, a second feature amount LSTMt of the 1024-dimensional vector to each triplet-unit 41 of the triplet unit 4 ((2) in FIG. 4).

The first, second, and third recognition units 411, 412, 413 of each triplet-unit 41 perform calculation, based on the second feature amount LSTMt from each LSTM31 in accordance with the triplet parameter W set in the learning process and output the posterior probability distribution vectors $s'_t$, $p'_t$, $o'_t$ of the subject, the predicate, and the object ((3) in FIG. 4).

The triplet unit 4 selects the triplet that takes the maximum value of the vector, from the triplets (combination of the subject, the predicate, and the object) output from each triplet-unit 41, based on the posterior probability distribution vectors $s'_t$, $p'_t$, $o'_t$ of the subject, the predicate, and the object output from the first, second, and third recognition units 411, 412, 413 of each triplet-unit 41, and recognizes the triplet as the inter-object relation and outputs the recognition result ((4) in FIG. 4).

Figure 5:
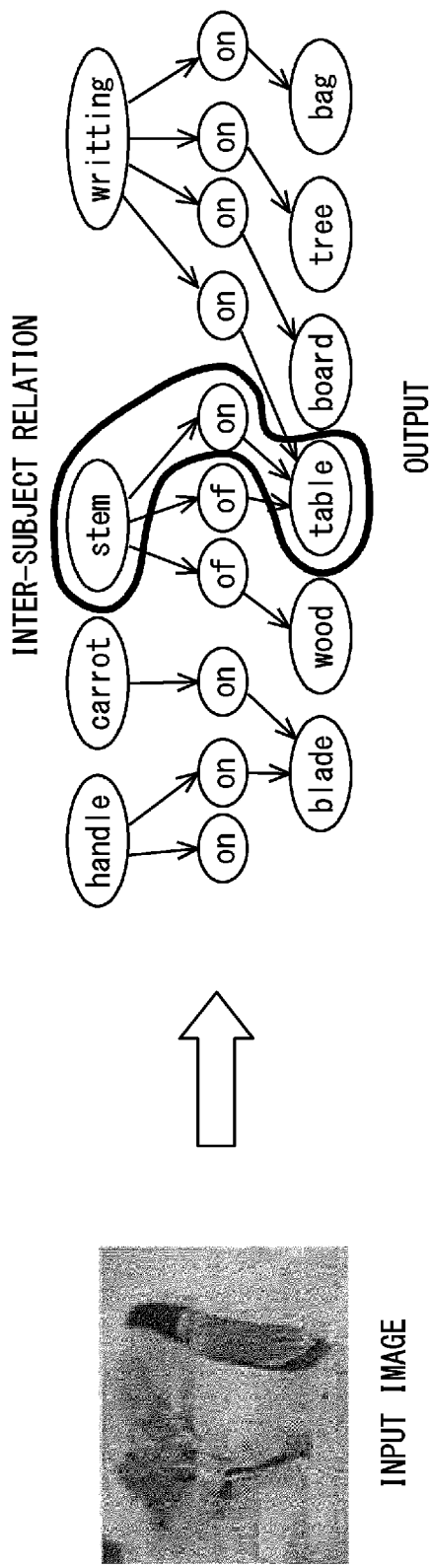
FIG. 5 is a diagram illustrating an example in which an inter-object relation is output as a graph.

The triplet unit 4, for example, as illustrated in FIG. 4, selects the triplet (Monitor on table) from the triplet (Monitor on table), (Mouse on table), . . . , and (Person sitting chair), and recognizes and outputs it as the inter-object relation. The inter-object relation recognition apparatus 1 outputs, for example, the inter-object relation output from the triplet unit 4 to a user using an output device such as a display, a speaker, a printer, or the like. The inter-object relation recognition apparatus 1 may output the inter-object relation (stem on table) as a graph, using the output device with respect to the input image, for example, as illustrated in FIG. 5. As a result, the user can visually and easily recognize the inter-object relation.

As described above, the inter-object relation recognition apparatus 1 according to the first embodiment inputs the feature amount of the image to the recursive second neural network 3 configured of a plurality of LSTMs31, and recognizes the inter-object relation from the output thereof, using the triplet-unit 41 of the triplet unit 4. As a result, it is possible to sequentially recognize and output the inter-object relations, and it is possible to output the inter-object relations in a short time, considering the output inter-object relation.

In addition, when a plurality of inter-object relations recognized from the image, it is preferable to suppress output the same inter-object relation redundantly or output of a plurality of similar inter-object relations. On the other hand, in the inter-object relation recognition apparatus 1 according to the first embodiment, the recursive second neural network 3 is modeled so as to consider past output results when sequentially outputting at each step. For this reason, while outputting various inter-object relations, it is possible to suppress the output of the same or similar inter-object relation, and to eliminate semantic overlap of the inter-object relations.

Further, in the method using the conventional ranking learning, modeling was performed so as to output a certain number of inter-object relations regardless of a size of a score based on a rank. On the other hand, the inter-object relation recognition apparatus 1 according to the first embodiment can sequentially output the inter-object relation. For this reason, the inter-object relation recognition apparatus 1 can select and output only the inter-object relation which is considered to be correct with respect to the recognition target image, for example. In other words, since the inter-object relation recognition apparatus 1 according to the first embodiment can output the arbitrary number of inter-object relations with the set maximum number or less, it is possible to selectively output the inter-object relation.

Figure 6:
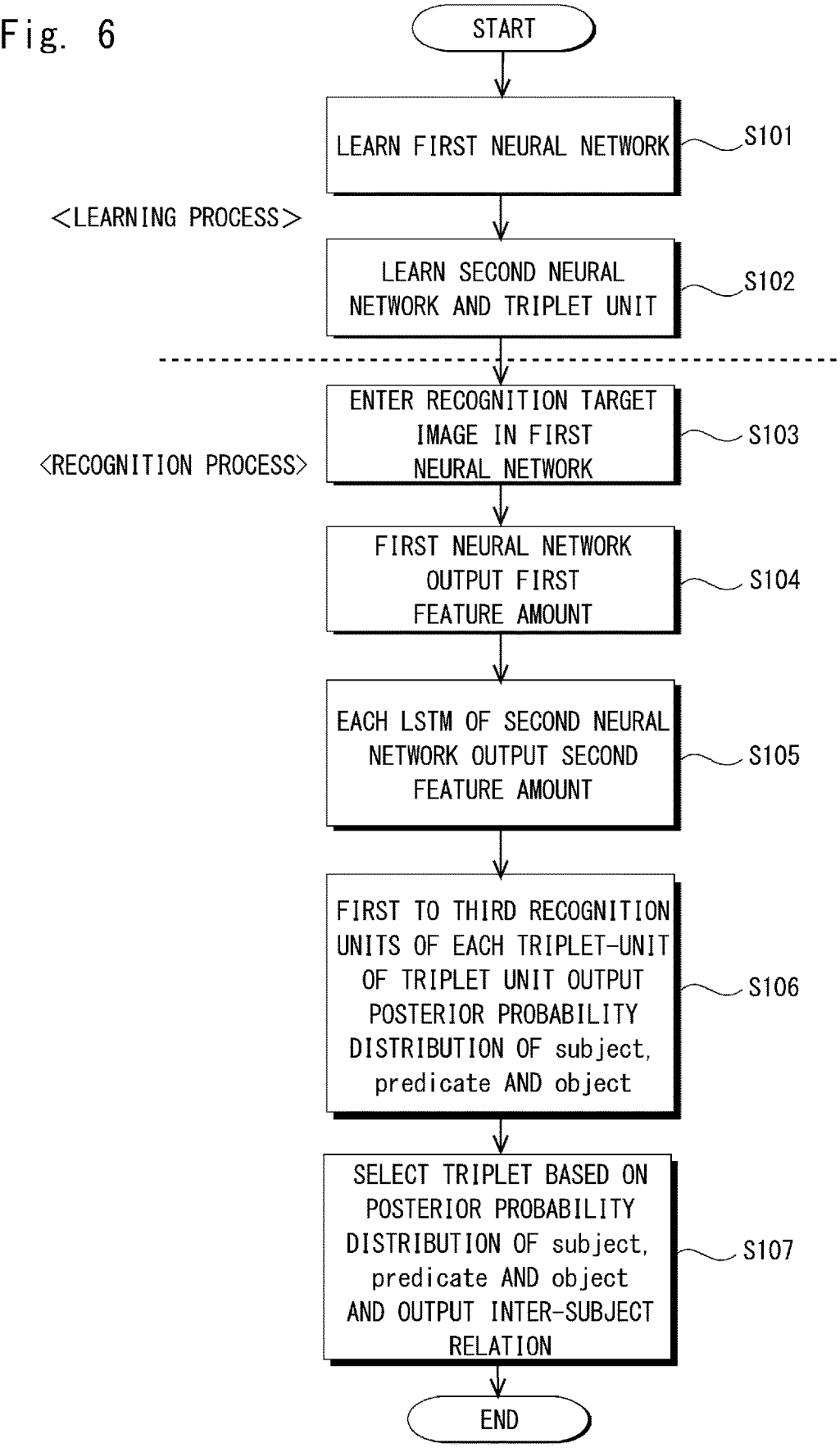
FIG. 6 is a flowchart illustrating a flow of a recognition method of the inter-object relation recognition apparatus according to the first embodiment.

FIG. 6 is a flowchart illustrating a flow of a recognition method of the inter-object relation recognition apparatus according to the first embodiment.

For example, in the learning process, the first neural network 2 performs learning, based on the previously prepared image data group and the like.

The second neural network 3 and the triplet unit 4 perform learning based on learning data associating images prepared in advance and inter-object relations and optimize the LSTM parameter Θ and the triplet parameter W of the loss function L (Θ, W) (Step S102).

Subsequently, in the recognition process, the recognition target image is input to the first neural network 2 (Step S103).

The first neural network 2 performs calculation based on the learned weighting coefficient based on the input recognition target image and outputs, for example, the first feature amount of the 4096-dimensional vector to each LSTM31 of the second neural network 3 (Step S104).

Each LSTM31 performs calculation according to the LSTM parameter Θ set in the learning step, based on the first feature amount of the 4096-dimensional vector from the first neural network 2 and outputs, for example, the second feature amount of the 1024-dimensional vector to each triplet-unit 41 of the triplet unit 4 (Step S105).

The first, second, and third recognition units 411, 412, 413 of each triplet-unit 41 perform calculation, based on the second feature amount of the 1024-dimensional vector from each LSTM31, in accordance with the triplet parameter W set in the learning process, and output the posterior probability distribution vectors of the subject, the predicate, and the object (Step S106).

The triplet unit 4 selects the triplet that takes the maximum value of the vector, based on the posterior probability distribution vectors of the subject, the predicate, and the object output from the first, second, and third recognition units 411, 412, 413 of each triplet-unit 41, from the triplet output from each triplet-unit 41, and outputs the triplet as the inter-object relation (Step S107).

Figure 8:
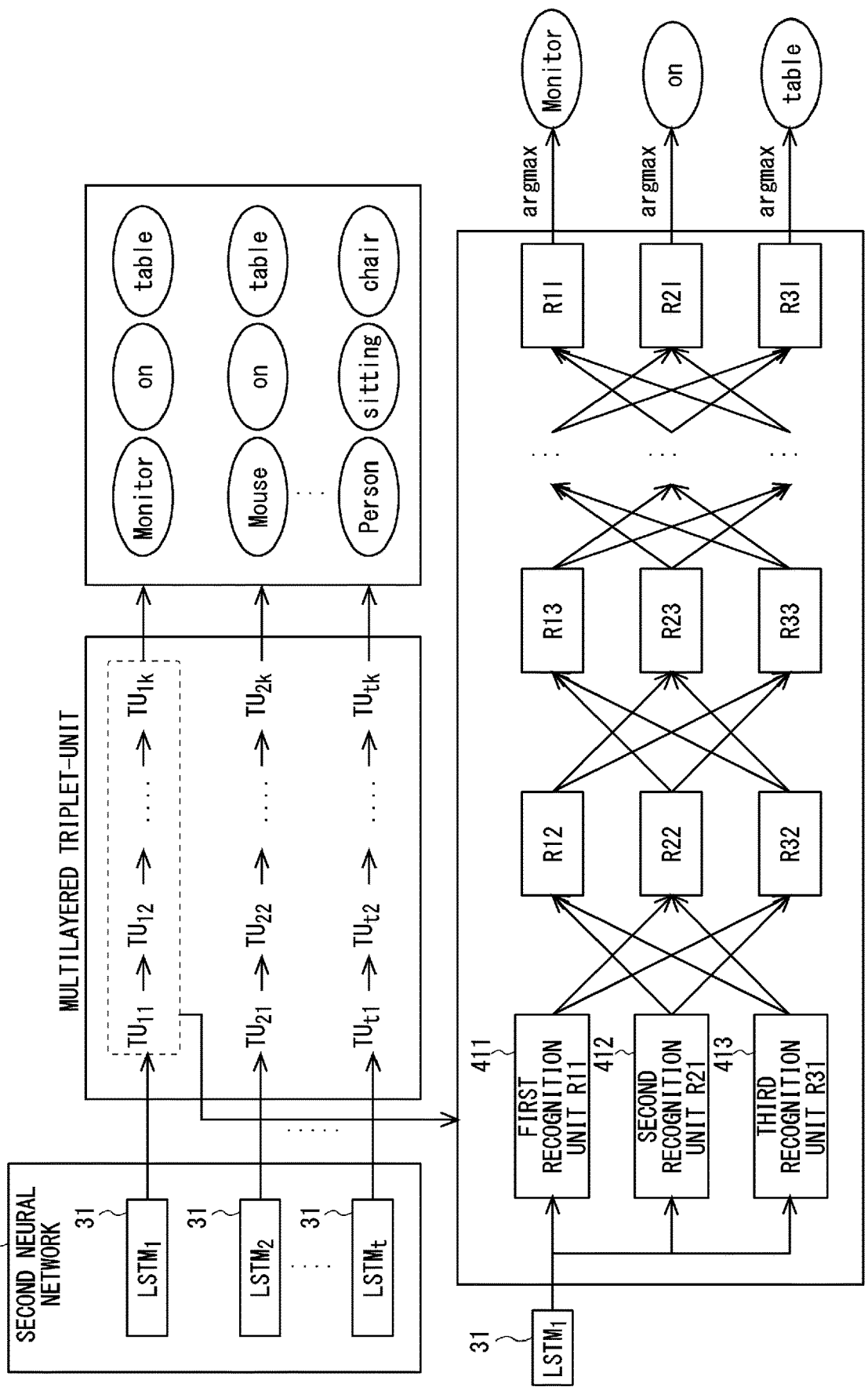
FIG. 8 is a diagram illustrating an example of a multi-layered triplet-unit.

As described above, the inter-object relation recognition apparatus 1 according to the first embodiment includes the first neural network 2 receiving the image and outputting the first feature amount indicating the feature of the image, the second neural network 3 receiving the first feature amount output from the first neural network 2, outputting the second feature amount of the lower dimension number than the first feature amount, and having the plurality of LSTMs 31 holding the internal states for the predetermined steps, and the triplet unit 4 having the plurality of triplet-units 41, the triplet-units 41 being connected to each LSTM31 of the second neural network 3, receiving the second feature amount output from each of the LSTMs 31, being constituted of the first, second, and third recognition units 411, 412, 413, and respectively outputting combinations of the subject, the predicate, and the object, the first, second, and third recognition units 411, 412, 413 respectively recognizing the subject, the predicate, and the object based on the received second feature amount, outputting the posterior probability distribution vectors of the subject, the predicate, and the object. The triplet unit 4 selects at least one combination of the subject, the predicate, and object, based on the posterior probability distribution vectors of the subject, the predicate, and the object output from the first, second, and third recognition units 411, 412, 413 of each triplet-unit 41, from the combinations of the subject, the predicate, and the object output from each triplet-unit 41, and recognizes the selected combination of the subject, the predicate, and the object as the relation between objects included in the image. The triplet-unit 41 may be multilayered as illustrated in FIG. 8, for example.

As described above, the inter-object relation recognition apparatus 1 according to the first embodiment decomposes the inter-object relation into the triplets of the subject, the predicate, and the object using each triplet-unit 41 of the triplet unit 4 and recognizes them. As a result, the calculation amount when recognizing the inter-object relation can be greatly reduced.

In addition, as described above, the inter-object relation recognition apparatus 1 according to the first embodiment inputs the feature amount of the image to the recursive second neural network 3 configured of the plurality of LSTMs31, and recognizes the inter-object relation from the output thereof, using the triplet-unit 41 of the triplet unit 4. As a result, it is possible to sequentially recognize and output the inter-object relations, and it is possible to output the inter-object relations in a short time, considering the output inter-object relation.

Further, in the inter-object relation recognition apparatus 1 according to the first embodiment, as described above, the recursive second neural network 3 is modeled so as to consider the past output results when sequentially outputting at each step. As a result, while outputting various inter-object relations, the output of the same or similar inter-object relation can be suppressed.

Further, as described above, the inter-object relation recognition apparatus 1 according to the first embodiment can sequentially output the inter-object relation. As a result, the inter-object relation recognition apparatus 1 can output the arbitrary number of inter-object relations with the set maximum number or less, and can selectively output the inter-object relation.

Embodiment 2

Figure 7:
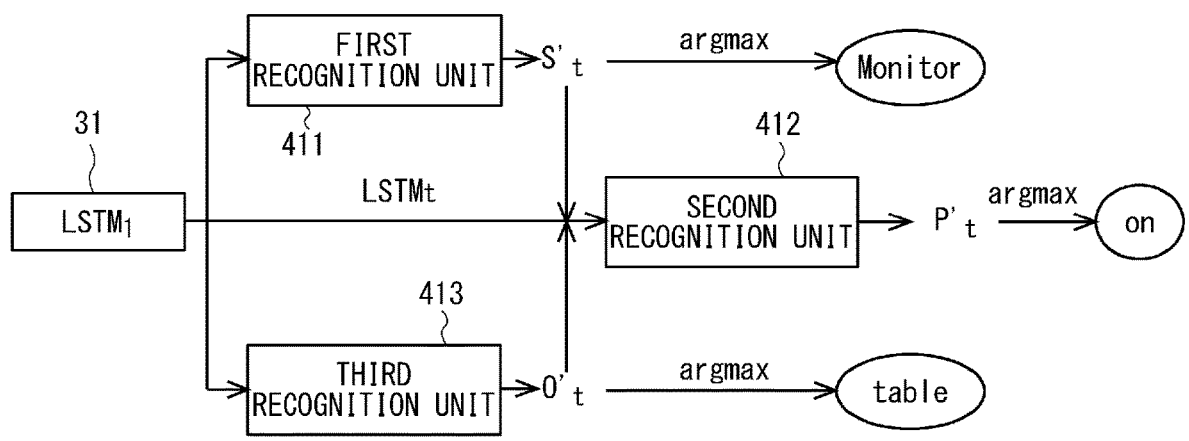
FIG. 7 is a diagram illustrating a triplet-unit according to a second embodiment of the present disclosure.

In the first embodiment, the first, second, and third recognition units 411, 412, 413 of the triplet-unit 41 independently recognize the subject, the predicate, and the object, respectively. On the other hand, in the second embodiment, as illustrated in FIG. 7, the second recognition unit 412 of the triplet-unit 41 is configured to recognize the predicate depending on the recognition results output from the first and third recognition units 411 and 413. The triplet-unit 41 is configured as a so-called Object-First type.

The first and third recognition units 411 and 413 respectively output the posterior probability distribution vectors $s'_t$, $o'_t$ of the subject and the object to the second recognition unit 412. The second recognition unit 412 recognizes the predicate and outputs the posterior probability distribution vector $p'_t$ of the predicate, based on the posterior probability distribution vectors $s'_t$, $o'_t$ of the subject and the object output from the first and third recognition units 411, 413, and the LSTMt output from the corresponding LSTM31.

With the above configuration, for example, it is possible to suppress recognition of wrong subjects, predicates, and objects such as (man, wear, horse), and to output a relation with higher appearance frequency between two objects. Therefore, recognition accuracy can be further improved. In the second embodiment, other configurations are substantially the same as those in the first embodiment, and the same reference numerals are attached to the same parts, and a detailed description thereof will be omitted.

Figure 9A:
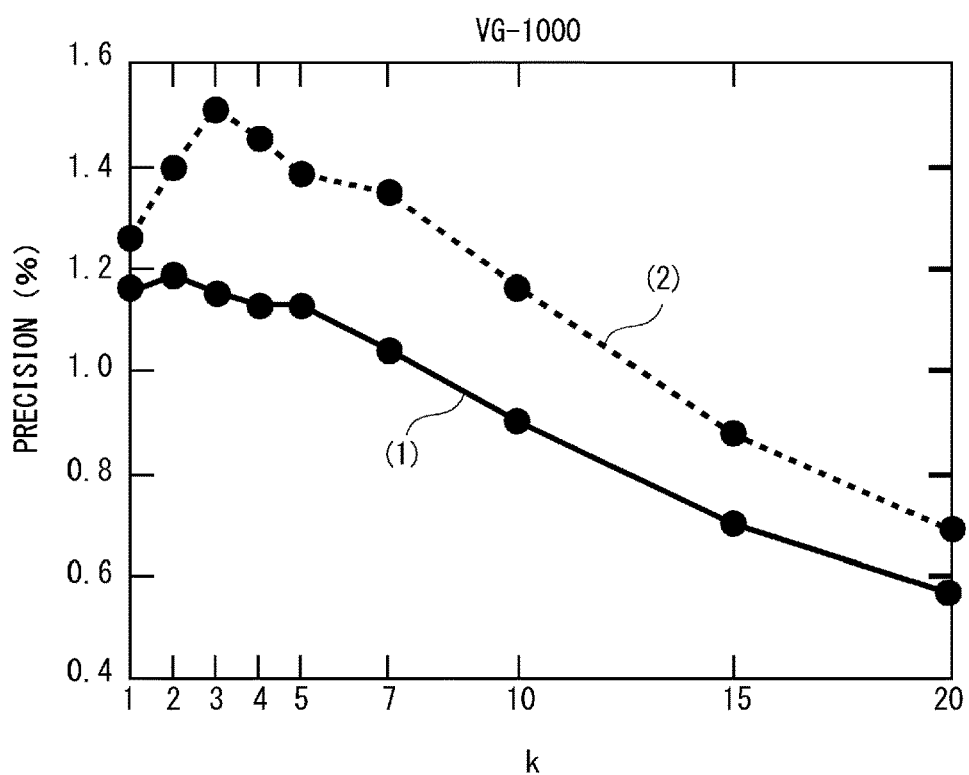
FIG. 9A is a diagram illustrating simulation results by the inter-object relation recognition apparatus 1 according to the first and second embodiments.
Figure 9B:
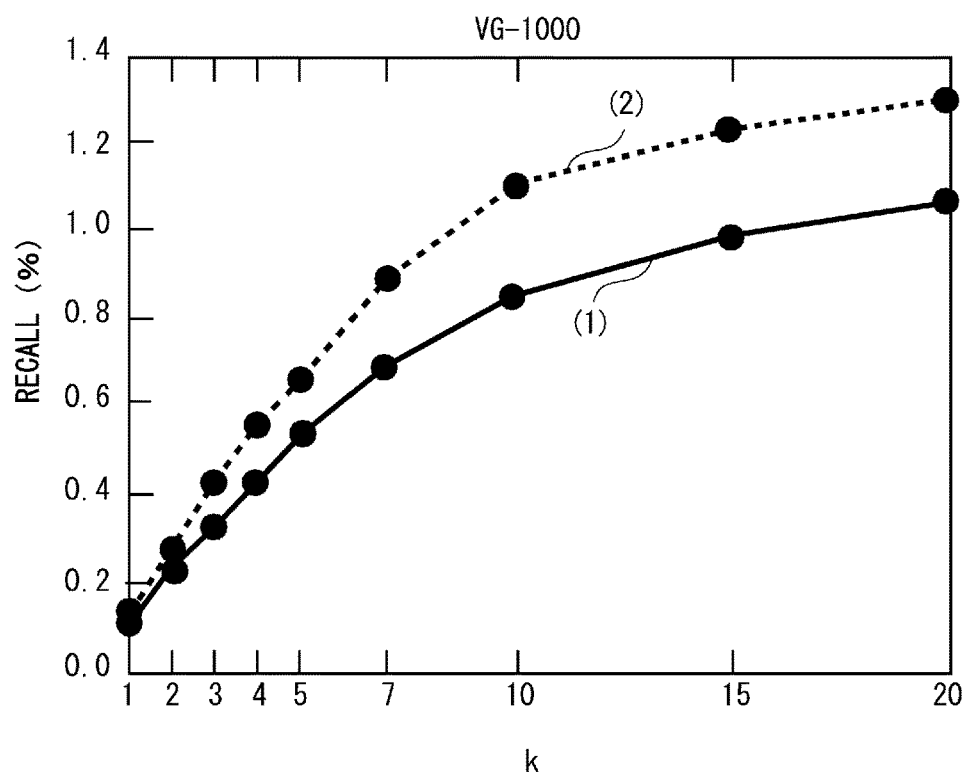
FIG. 9B is a diagram illustrating simulation results by the inter-object relation recognition apparatus 1 according to the first and second embodiments.

FIG. 9A and FIG. 9B are diagrams illustrating simulation results by the inter-object relation recognition apparatus 1 according to the first and second embodiments. In FIG. 9A and FIG. 9B, the vertical axes respectively indicate Precision (%) and Recall (Reproducibility) (%), and the horizontal axis is the number of inter-object relations recognized by each inter-object relation recognition apparatus 1. The solid line (1) shows the result of the inter-object relation recognition apparatus 1 according to the first embodiment, and the dotted line (2) shows the result of the inter-object relation recognition apparatus 1 according to the second embodiment. This simulation is performed using data in which the number of object classes and the number of relation classes are each 1,000.

As illustrated in FIG. 9A and FIG. 9B, it is understood that the inter-object relation recognition apparatus 1 according to the second embodiment shows excellent results in both Precision and Recall, as compared with the inter-object relation recognition apparatus 1 according to the first embodiment.

Embodiment 3

Figure 10:
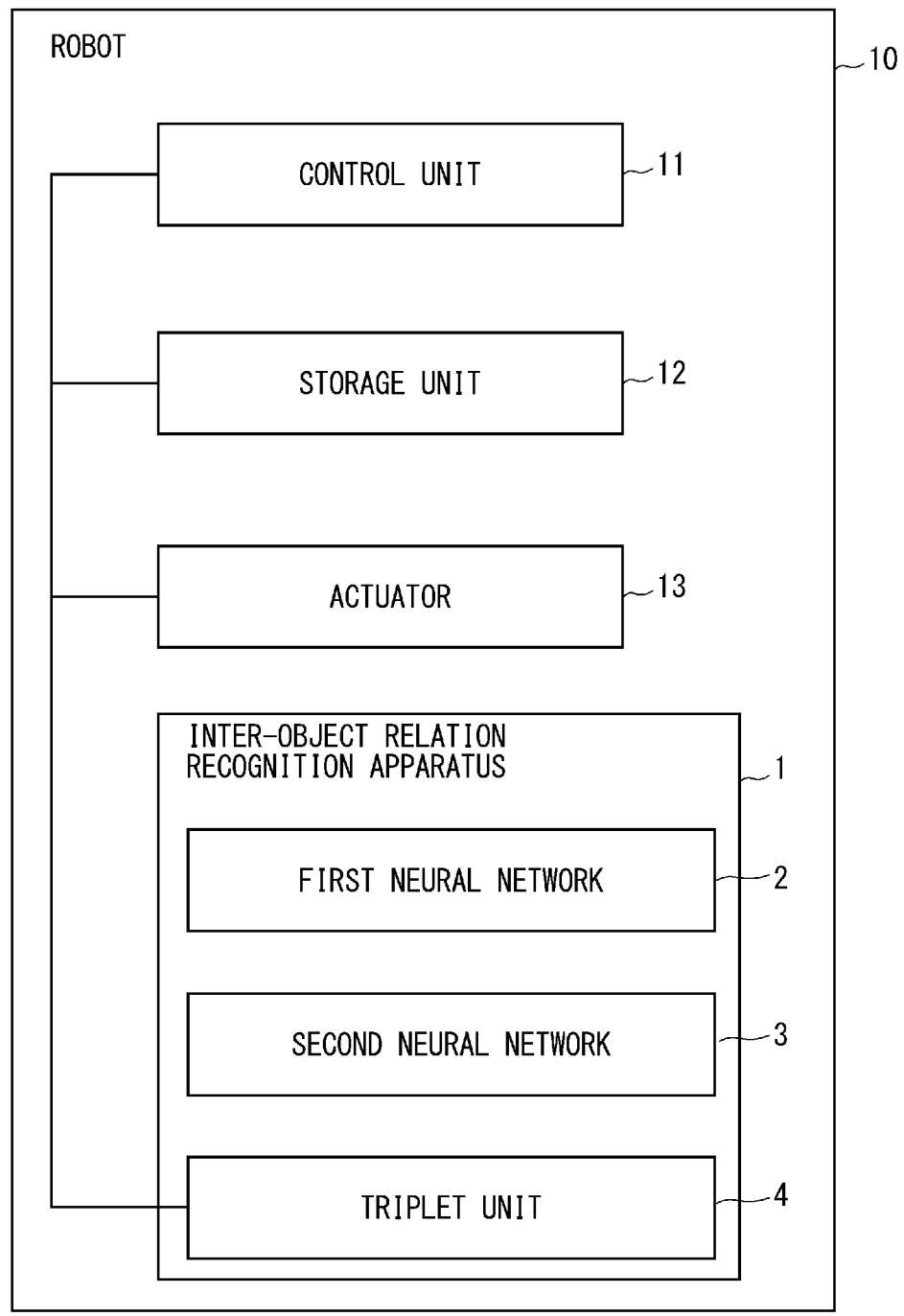
FIG. 10 is a block diagram illustrating a schematic configuration of a robot mounted with an inter-object relation recognition apparatus.

In the third embodiment of the present disclosure, the inter-object relation recognition apparatus 1 according to the first or second embodiment may be mounted on an autonomous robot 10 as illustrated in FIG. 10, for example. FIG. 10 is a block diagram illustrating a schematic configuration of a robot mounted with an inter-object relation recognition apparatus.

For example, the robot 10 manipulates an operation target, based on the inter-object relation recognized by the inter-object relation recognition apparatus 1. The robot 10 includes a control unit 11, a storage unit 12, an actuator 13, and the like, and stores the recognized inter-object relation in the storage unit 12 of the robot 10. The control unit 11 controls the operation of the actuator 13 and the like according to the inter-object relation stored in the storage unit 12.

Figure 11:
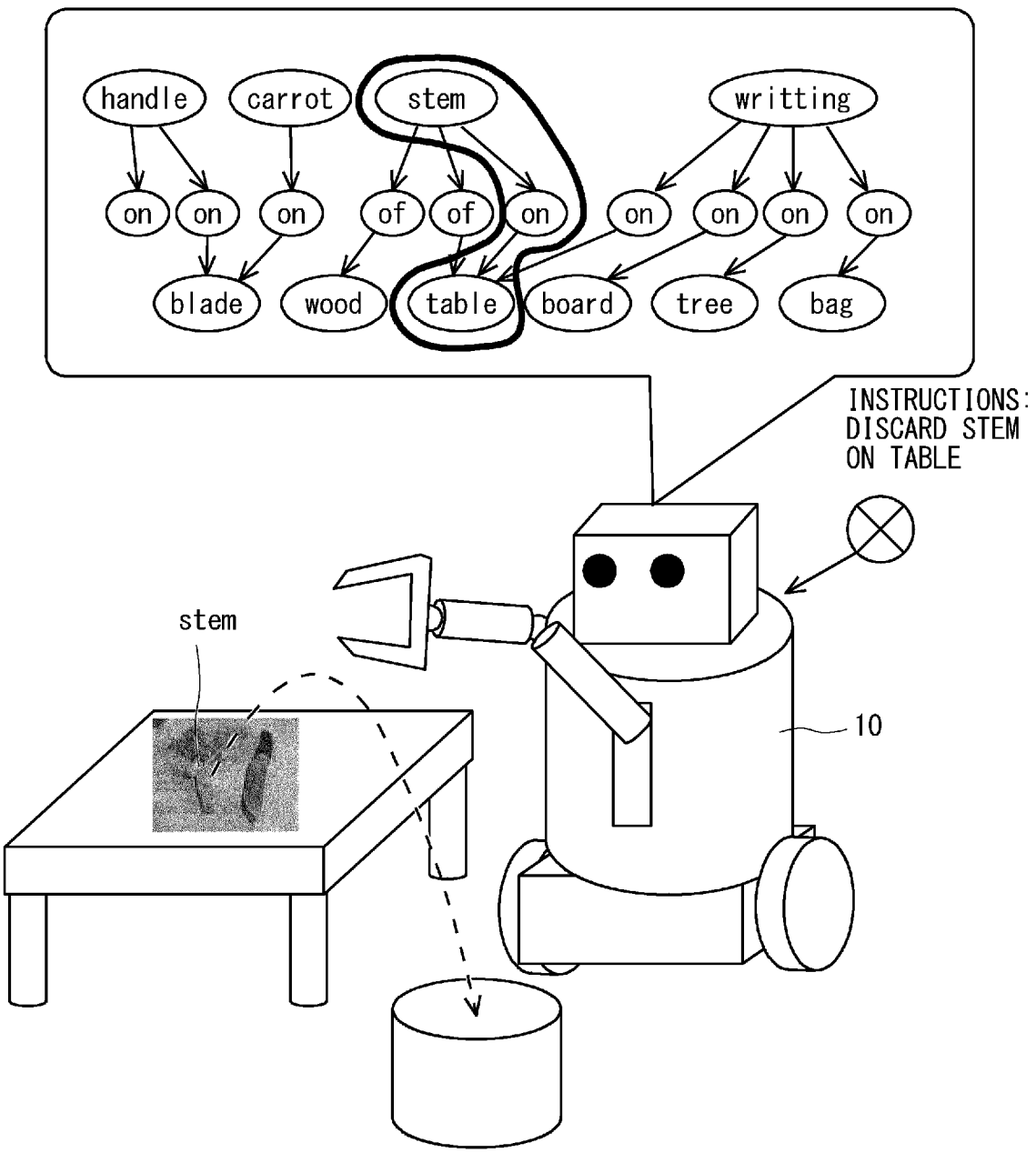
FIG. 11 is a diagram illustrating an operation of a robot according to a recognized inter-object relation.

For example, as illustrated in FIG. 11, the robot 10 grasps an object (stem) on the table (table) according to the recognized inter-object relation (stem on table) and puts it in a garbage can or the like. As a result, the robot 10 can manipulate the operation target with high accuracy and safely, using the inter-object relation recognized by the inter-object relation recognition apparatus 1.

In the third embodiment, the inter-object relation recognition apparatus 1 is configured to be mounted on the robot 10, but is not limited to this. The inter-object relation recognition apparatus 1 may be configured not to be mounted on the robot 10. In this case, the inter-object relation recognition apparatus 1 may transmit the recognized inter-object relation to the robot 10 via wired or wireless. In the third embodiment, the other configurations are substantially the same as those in the first and second embodiments, and the same reference numerals are attached to the same parts, and a detailed description thereof will be omitted.

Several embodiments of the present disclosure have been described, but these embodiments have been presented by way of example and are not intended to limit the scope of the disclosure. These novel embodiments can be implemented in various other forms and various omissions, replacements, and changes can be made without departing from the spirit of the disclosure. These embodiments and modifications thereof are included in the scope and gist of the disclosure and are included in the disclosure described in the Claims and the equivalent scope thereof.

For example, in the above embodiment, the second neural network 3 has configuration having a plurality of the LSTMs 31, but it is not limited to this. For example, the second neural network 3 may have a configuration having a plurality of GRUs (Gated Recurrent Units). GRU is a simplified model of a configuration of the LSTM31. The GRU has a structure in which the number of gates of the LSTM31 is reduced from three to two. The GRU controls the maintenance and output of contents of memory cells by two gates of Update Gate and Reset Gate. Further, the second neural network 3 may have a configuration having a plurality of bidirectional LSTMs (bidirectional LSTM).

In the present disclosure, for example, the process illustrated in FIG. 6 can also be achieved by making the CPU to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the present disclosure can also be achieved by a learned model. The learned model is assumed to be used as a program module which is a part of artificial intelligence software. The learned model is used in a computer including a CPU and a memory. Specifically, according to instructions from the learned model stored in the memory, the CPU of the computer performs calculation based on the learned weighting coefficients in the first neural network 2, the second neural network 3, and the triplet unit 4, with respect to the recognition target image input to the first neural network 2, and operates so that the result (each relation between objects included in the recognition target image) is output from the triplet unit 4.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An inter-object relation recognition apparatus configured to perform learning based on learning data associated with an image, and a plurality of relations between objects included in the image, and to recognize and output the relations between objects included in the image using a result of the learning, the apparatus comprising:
   a first learning device configured to receive the image and output a first feature amount indicating a feature of the image;
   a second learning device configured to receive the first feature amount output from the first learning device and output a second feature amount of a lower dimension number than the first feature amount, and the second learning device including a plurality of storage units holding internal states for predetermined steps; and
   a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements,
   wherein the triplet unit selects at least one combination of the first, second, and third elements, based on the probability information of the first, second, and third elements output from the first, second, and third recognition units of each of the triplet-units, from the combinations of the first, second, and third elements output from each of the triplet-units, and recognizes and outputs the selected combination of the first, second, and third elements as the relation between objects included in the image.

2. The inter-object relation recognition apparatus according to claim 1, wherein
   the second learning device is a recurrent neural network, and
   the second learning device and the triplet unit perform the learning by optimizing parameters of a predetermined function, based on learning data associating the image and the relations between objects and hold the optimized parameter as the result of the learning.

3. The inter-object relation recognition apparatus according to claim 1, wherein
   the first and third recognition units respectively output the probability information of the first and third elements to the second recognition unit, and
   the second recognition unit recognizes the second element, based on the first and third elements output from the first and third recognition units, and the second feature amount output from the corresponding storage unit of the second learning device, and outputs the probability information of the second element.

4. The inter-object relation recognition apparatus according to claim 1,
   wherein the storage unit of the second learning device is an LSTM (Long Short-Term Memory).

5. The inter-object relation recognition apparatus according to claim 1,
   wherein the first learning device is configured as a convolution type neural network.

6. A learned model for making a computer function comprising:
   a first learning device configured to receive an image, output a first feature amount indicating a feature of the image;
   a second learning device configured to receive the first feature amount output from the first learning device, output a second feature amount of a lower dimension number than the first feature amount, and have a plurality of storage units holding internal states for predetermined steps; and
   a triplet unit including a plurality of triplet-units, the triplet-units connected to each storage unit of the second learning device, receiving the second feature amount output from each of the storage units, constituted of first, second, and third recognition units, and outputting combinations of the first, second, and third elements, the first, second, and third recognition units respectively recognizing the first, second, and third elements based on the received second feature amount, outputting probability information of the first, second, and third elements, wherein,
   the triplet unit is configured to select at least one combination of the first, second, and third elements, based on the probability information of the first, second, and third elements output from the first, second, and third recognition units of each of the triplet-units, from the combinations of the first, second, and third elements output from each of the triplet-units, and recognize the selected combination of the first, second, and third elements as the relation between objects included in the image,
   a weighting coefficient of the first learning device, the second learning device, and the triplet unit is learned, based on learning data associating the image and the relations between objects included in the image, and
   when an image of a recognition target is input, it is intended that the first learning device, the second learning device, and the triplet unit perform calculations based on the learned weighting coefficients, and each relation between objects included in the image of the recognition target is recognized.

7. A recognition method of an inter-object relation recognition apparatus comprising:
   a first learning device configured to receive an image, output a first feature amount indicating a feature of the image;
   a second learning device configured to receive the first feature amount output from the first learning device, output a second feature amount of a lower dimension number than the first feature amount, and have a plurality of storage units holding internal states for predetermined steps; and
   a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements, wherein the triplet unit selects at least one combination of the first, second, and third elements, based on the probability information of the first, second, and third elements output from the first, second, and third recognition units of each of the triplet-units, from the combinations of the first, second, and third elements output from each of the triplet-units, and recognizes and outputs the selected combination of the first, second, and third elements as the relation between objects included in the image.

8. A non-transitory computer readable medium storing a program of an inter-object relation recognition apparatus comprising:
 a first learning device configured to receive an image, output a first feature amount indicating a feature of the image;
 a second learning device configured to receive the first feature amount output from the first learning device, output a second feature amount of a lower dimension number than the first feature amount, and have a plurality of storage units holding internal states for predetermined steps; and
 a triplet unit including a plurality of triplet-units, the triplet-units connected to each storage unit of the second learning device, receiving the second feature amount output from each of the storage units, constituted of first, second, and third recognition units, and respectively outputting combinations of the first, second, and third elements, the first, second, and third recognition units respectively recognizing the first, second, and third elements based on the received second feature amount, outputting probability information of the first, second, and third elements,
wherein the triplet unit makes a computer to execute a process of selecting at least one combination of the first, second, and third elements, based on the probability information of the first, second, and third elements output from the first, second, and third recognition units of each of the triplet-units, from the combinations of the first, second, and third elements output from each of the triplet-units, and recognizing and outputting the selected combination of the first, second, and third elements as the relations between objects included in the image.

* * * * *